UNITED STATES PATENT OFFICE.

ALEXANDER R. TILLINGHAST, OF SOLVAY, NEW YORK, ASSIGNOR TO SEMET-SOLVAY COMPANY, OF SOLVAY, NEW YORK, A CORPORATION OF NEW YORK.

PROCESS OF MAKING SODIUM FERROCYANID.

1,252,742. Specification of Letters Patent. Patented Jan. 8, 1918.

No Drawing. Application filed January 10, 1917. Serial No. 141,540.

*To all whom it may concern:*

Be it known that I, ALEXANDER R. TILLINGHAST, a citizen of the United States, residing at Solvay, in the county of Onondaga and State of New York, have invented certain new and useful Improvements in Processes of Making Sodium Ferrocyanid, of which the following is a specification.

As is well known sodium ferrocyanid may be formed by scrubbing gas containing cyanogen, such as the gas resulting from the destructive distillation of coal, with water containing ferrous hydrate or ferrous carbonate, or both, in suspension and having soda ash ($Na_2CO_3$) in solution.

In an application for Letters Patent filed by me December 20, 1916, Serial No. 107,970, I have described a process for the making of sodium ferrocyanid which is particularly characterized by treating the solution of sodium ferrocyanid formed upon scrubbing the gas as above stated with milk of lime to convert the soda ash remaining in solution into more soluble caustic soda, and break up insoluble ferrocyanids formed in the scrubbing. In such process upon crystallizing out of solution the sodium ferrocyanid formed, caustic soda and a residue of sodium carbonate will remain in solution in the mother liquor with the uncrystallized sodium ferrocyanid, and upon further concentration of the mother liquor some of the sodium compounds will crystallize out ahead of the ferrocyanid thus giving an impure product. The object of my present invention is to enable the complete recovery of the sodium ferrocyanid in the solution in a simple and inexpensive manner and without contamination and at the same time to recover and utilize the caustic soda remaining in the mother liquor.

To this end, after the sodium ferrocyanid has been crystallized out of the formed solution thereof as completely as may be without also throwing out impurities, which may be done in any usual or suitable well known manner, the mother liquor is added to a solution of copperas (ferrous sulfate) by combination with which the sodium ferrocyanid is converted into insoluble ferrous ferrocyanid while with the caustic soda and sodium carbonate are formed respectively ferrous hydrate and ferrous carbonate, according to the reactions:

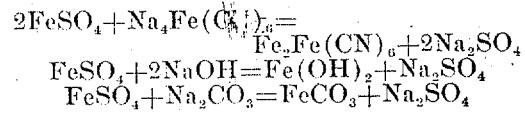

the ferrous hydrate and ferrous carbonate being used in repeating the process.

Additional ferrous hydrate or carbonate for the purpose is provided by treating copperas with caustic soda or sodium carbonate.

The cyanogen containing gas, from which the ammonia has been removed so far as practicable, is then scrubbed in a suspension of the ferrous hydrate and carbonate (washed clean of sodium sulfate), together with the intermixed ferrous ferrocyanid, in a solution of soda ash. Upon scrubbing the gas sodium ferrocyanid is formed by combination of cyanogen in the gas with the ferrous hydrate and ferrous carbonate.

The liquor from the scrubber contains sodium ferrocyanid, which is in solution, soda ash in solution, two thirds of which exists as sodium bicarbonate, a large excess of ferrous sulfid in the form of a black, insoluble sludge, a considerable quantity of insoluble ammonia ferrocyanid, due to the presence of unseparated ammonia in the gas, the insoluble ferrous ferrocyanid formed by the combination of the sodium ferrocyanid in the mother liquid with the ferrous sulfate and possibly small quantities of other insoluble ferrocyanids.

In order to convert the insoluble ferrocyanids into the soluble form, milk of lime is added to the mixture which is then boiled and allowed to settle. The amount of lime added is such as is necessary to effect the desired reaction, *i. e.*, on an average from .1 to .5 of a pound of milk of lime to each gallon of liquor. The lime converts the bicarbonate and sodium carbonate present into caustic soda which in turn converts the insoluble ferrocyanids into soluble ferrocyanid as, for example, according to the reaction.

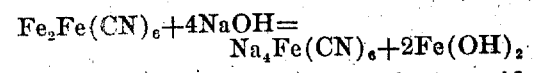

Thus the residue of sodium ferrocyanid which was left in the mother liquor from the preceding crystallization is returned to the solution in the same form while the caustic soda and sodium carbonate have been utilized in forming fresh ferrous hydrate and ferrous carbonate to be used in repeating the process.

The solution is then concentrated by evaporation, with the addition of salt if desired, as above-described, the sodium ferrocyanid is crystallized out and the operation is repeated as before.

What I claim as new and desire to secure by Letters Patent is:

In the process of producing sodium ferrocyanid from the cyanogen content of gas, the method of recovering from a mother liquor from which sodium ferrocyanid has been crystallized the residue of sodium ferrocyanid and caustic soda and sodium carbonate contained therein which consists in treating ferrous sulfate with the mother liquor whereby the sodium ferrocyanid is converted into ferrous ferrocyanid and the caustic soda and sodium carbonate form ferrous hydrate and ferrous carbonate forming a suspension of the ferrous ferrocyanid, ferrous hydrate and ferrous carbonate in a solution of soda ash and scrubbing cyanogen containing gas therewith in a repetition of the process, and finally treating the resulting solution with milk of lime to convert the insoluble ferrous ferrocyanid into sodium ferrocyanid.

In testimony whereof I have affixed my signature, this 8th day of January, 1917.

ALEXANDER R. TILLINGHAST.